US012716134B2

(12) United States Patent
Takahashi et al.

(10) Patent No.: US 12,716,134 B2
(45) Date of Patent: Aug. 25, 2026

(54) GRAIN-ORIENTED ELECTRICAL STEEL SHEET AND MANUFACTURING METHOD THEREFOR

(71) Applicant: NIPPON STEEL CORPORATION, Tokyo (JP)

(72) Inventors: Masaru Takahashi, Tokyo (JP); Shuichi Yamazaki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 218 days.

(21) Appl. No.: 18/280,872

(22) PCT Filed: Mar. 11, 2022

(86) PCT No.: PCT/JP2022/011050

§ 371 (c)(1),
(2) Date: Sep. 7, 2023

(87) PCT Pub. No.: WO2022/191327

PCT Pub. Date: Sep. 15, 2022

(65) Prior Publication Data

US 2024/0295029 A1 Sep. 5, 2024

(30) Foreign Application Priority Data

Mar. 11, 2021 (JP) ................................. 2021-038990

(51) Int. Cl.

| | |
|---|---|
| ***C23C 24/10*** | (2006.01) |
| ***C25F 3/14*** | (2006.01) |
| ***H01F 1/147*** | (2006.01) |

(52) U.S. Cl.
CPC .............. *C23C 24/103* (2013.01); *C25F 3/14* (2013.01); *H01F 1/14791* (2013.01)

(58) Field of Classification Search
CPC .. H01F 1/18; H01F 1/147; C21D 1/74; C21D 6/002; C21D 6/005; C21D 6/008; C21D 8/0284; C21D 8/1222; C21D 8/1244; C21D 8/1233; C21D 8/1255; C21D 8/1261; C21D 8/1266; C21D 8/1272; C21D 8/1283; C21D 8/1294; C21D 9/46; C21D 2201/05;
(Continued)

(56) References Cited

U.S. PATENT DOCUMENTS 4,750,949 A * 6/1988 Kobayashi .............. C23C 22/74
148/113
2012/0088096 A1 * 4/2012 Takeda .................. C04B 28/344
428/327
(Continued)

FOREIGN PATENT DOCUMENTS

EP 1 342 818 B1 9/2016
JP 8-325745 A 12/1996
(Continued)

*Primary Examiner* — Megha M Gaitonde
(74) *Attorney, Agent, or Firm* — Birch, Stewart, Kolasch & Birch, LLP

(57) ABSTRACT

This grain-oriented electrical steel sheet is a grain-oriented electrical steel sheet having a final annealing film mainly composed of forsterite and an insulation coating containing pseudo-tetragonal aluminum borate and silica on its surface, wherein one surface or both surfaces of the steel sheet have linear grooves or dot-row shaped recesses with a depth of 5 to 40 μm.

2 Claims, 2 Drawing Sheets

(58) Field of Classification Search
CPC ... C22C 38/001; C22C 38/002; C22C 38/004; C22C 38/008; C22C 38/02; C22C 38/04; C22C 38/06; C22C 38/12; C22C 38/14; C22C 38/20; C22C 38/22; C22C 38/24; C22C 38/26; C22C 38/28; C22C 38/32; C22C 38/34; C22C 38/40; C22C 38/60; C22C 38/82; C23C 28/04; C23C 22/00; C23C 22/12; C23C 22/18; C23C 22/20; C23C 22/22; C23C 22/33; C23C 22/42; C23C 22/43; C23C 22/74; B32B 15/04; B32B 15/18; B32B 15/20; C23G 1/08

USPC ....... 428/156, 161, 163, 164, 167, 172, 173, 428/212, 213, 220
See application file for complete search history.

(56) References Cited

U.S. PATENT DOCUMENTS

| | | | | |
|---|---|---|---|---|
| 2013/0177743 | A1* | 7/2013 | Watanabe | C23C 22/33 428/167 |
| 2020/0095648 | A1 | 3/2020 | Han et al. | |
| 2021/0381072 | A1 | 12/2021 | Yamazaki et al. | |
| 2025/0109452 | A1* | 4/2025 | Yamazaki | C21D 9/46 |

FOREIGN PATENT DOCUMENTS

| | | | |
|---|---|---|---|
| JP | 2001-316896 | A | 11/2001 |
| JP | 2003-301271 | A | 10/2003 |
| JP | 2003-301272 | A | 10/2003 |
| JP | 2004-99929 | A | 4/2004 |
| JP | 2004-269925 | A | 9/2004 |
| JP | 2009-19274 | A | 1/2009 |
| WO | WO 2020/085024 | A1 | 4/2020 |

* cited by examiner

GRAIN-ORIENTED ELECTRICAL STEEL SHEET AND MANUFACTURING METHOD THEREFOR

TECHNICAL FIELD

The present invention relates to a grain-oriented electrical steel sheet, and particularly, a grain-oriented electrical steel sheet with low iron loss and a method for manufacturing the same. Priority is claimed on Japanese Patent Application No. 2021-38990, filed Mar. 11, 2021, the content of which is incorporated herein by reference.

BACKGROUND ART

A grain-oriented electrical steel sheet is a steel sheet that has a crystal structure with the (110) [001] orientation as a main orientation, and generally contains 2 mass % or more of Si. Its main application is as an iron core material for transformers and the like, and particularly, there is a demand for materials with less energy loss during transformation, that is, materials with low iron loss.

Here, a typical process of manufacturing a grain-oriented electrical steel sheet is as follows. First, a slab containing 2 to 4 mass % of Si is hot-rolled and the hot-rolled sheet is annealed. Next, the sheet is subjected to cold rolling once or twice or more times with intermediate annealing therebetween to have a final sheet thickness, and decarburization annealing is performed. Then, an annealing separator mainly composed of MgO is applied and final annealing is performed. Thereby, the crystal structure with the (110) [001] orientation as a main orientation develops and a final annealing film mainly composed of forsterite ($Mg_2SiO_4$) is formed on the surface of the steel sheet. Finally, a coating solution for forming an insulation coating is applied and fired, and an insulation coating is formed, and then shipping is performed.

A magnetic domain control technology is one method for reducing iron loss in grain-oriented electrical steel sheets. When an AC magnetic field is applied to an electrical steel sheet, the direction of the magnetic field changes periodically, but an eddy current is generated in the electrical steel sheet so that the direction of the magnetic field is prevented from changing. Since this eddy current increases with the magnetic domain width, the eddy current can be reduced by narrowing the magnetic domain width. Various methods have been developed as magnetic domain control technologies. For example, a method of refining magnetic domains by laser irradiation to the surface of a steel sheet, and a method of forming grooves in a steel sheet by applying a mechanical load (scratching, etc.) and refining magnetic domains may be exemplified. In addition, a method of forming a base steel exposed part on the surface of a grain-oriented electrical steel sheet on which an insulation coating is formed and then processing periodic grooves in the steel sheet by an electrolytic etching method and refining magnetic domains may also be exemplified.

In addition, a grain-oriented electrical steel sheet has a property of improving iron loss by imparting tension to the grain-oriented electrical steel sheet. Therefore, increasing coating tension acting on the grain-oriented electrical steel sheet is also effective in reducing iron loss. For example, it is known that an $Al_2O_3$—$B_2O_3$-based crystalline coating obtained by firing a coating solution mainly composed of alumina sol and boric acid has about twice the coating tension of a general coating.

By combining these technologies, grain-oriented electrical steel sheets with very low iron loss can be obtained, but in actual manufacturing, it is also important to reduce costs as much as possible. Particularly, when groove forming is performed by etching, application and removal of the resist coating is one cause of cost increase.

CITATION LIST

Patent Document

Patent Document 1

Japanese Unexamined Patent Application, First Publication No. 2001-316896

Patent Document 2

Japanese Unexamined Patent Application, First Publication No. 2003-301272

Patent Document 3

Japanese Unexamined Patent Application, First Publication No. 2004-269925

Patent Document 4

PCT International Publication No. WO 2020/085024

Patent Document 5

Japanese Unexamined Patent Application, First Publication No. 2004-099929

SUMMARY OF THE INVENTION

Problems to be Solved by the Invention

As described above, various developments have been made to reduce the iron loss of grain-oriented electrical steel sheets.

Patent Document 1 discloses a method in which, when groove processing is performed by electrolytic etching, an insulation coating formed on the surface of the grain-oriented electrical steel sheet is used as a resist. Specifically, Patent Document 1 proposes a following method. At first a part of the insulation coating for the grain-oriented electrical steel sheet is removed by laser irradiation or the like, a base metal exposed part is subjected to electrolytic etching, and grooves are formed. After that, the insulation coating is then applied again. The insulation coating used as a resist does not need to be removed even after etching processing and can be directly used as an insulation coating. That is, it is considered that, according to the manufacturing method of Patent Document 1, the operation efficiency when the grain-oriented electrical steel sheet with low iron loss is manufactured is improved, and cost reduction is realized.

However, in the manufacturing method according to Patent Document 1, a specific example of an insulation coating that can be used as a resist is not disclosed.

Patent Document 2 proposes use of an insulation coating mainly composed of colloidal silica and phosphate as a resist coating for electrolytic etching.

However, as will be described in detail below, in electrolytic etching, the resist coating is required to have chemical resistance to both acidity and alkalinity. The resist insulation coating of Patent Document 2 may not have sufficient resistance to alkalinity, and peeling deterioration often occurs during electrolytic etching. Peeling off of the insulation coating during electrolytic etching is significant near the grooves. If the insulation coating peels off near the grooves, the width of the grooves widens at that location, and fluctuation in the groove width occur. Non-uniformity of the groove width makes the magnetic domain refining effect insufficient as will be described below. Therefore, further improvement in the chemical resistance to acidity and alkalinity is required in the resist coating.

In Patent Document 3, an object is to provide an insulation coating that does not deteriorate even with electrolytic etching and has performance as an insulation coating for grain-oriented electrical steel sheets, for example, an insulating property, a property of imparting tension to a steel sheet, and corrosion resistance. As a solution of the object, firing a coating solution containing phosphate and colloidal silica is proposed. Specifically, it discloses that the performance of the insulation coating is improved by controlling the firing temperature, for example, the coating tension is increased by setting a relatively high firing temperature of 600 to 900° C., and the coating resistance (resist resistance) is increased by setting a relatively low firing temperature of 400 to 600° C.

However, as will be described below, in the case of insulation coating mainly composed of colloidal silica and phosphate, it is difficult to simultaneously increase both the coating tension and the coating resistance (resist resistance), and there is a tradeoff relationship in which one increases when the other decreases.

Patent Document 4 does not describe or suggest electrolytic etching, but it discloses an insulation coating for grain-oriented electrical steel sheets having high coating tension and exceptional corrosion resistance. Specifically, Patent Document 4 proposes applying a coating solution for an insulation coating containing aluminum-containing hydrous silicate particles and boric acid to an electrical steel sheet and performing firing at 600 to 1,000° C., which makes it possible to obtain coating properties with high coating tension and exceptional corrosion resistance without using chromium compounds. In addition, the corrosion resistance here is the corrosion resistance of the fired insulation coating to a neutral NaCl solution and is not the resistance of a resist coating in electrolytic etching.

As described above, Patent Document 4 does not describe or suggest electrolytic etching of the insulation coating, and the coating resistance (resist property) in the case of electrolytic etching is unknown.

Patent Document 5 describes that, after a forsterite final annealing film and an insulation coating containing an aluminum borate substance are formed, tension is imparted to the steel sheet by introducing dot-row shaped local strains and grooves by laser irradiation, and a low iron loss effect can be obtained. However, this document does not describe a specific method for forming grooves, and it is unclear whether a method for forming grooves by electrolytic etching is possible.

In view of the above circumstances, an object of the present invention is to provide a grain-oriented electrical steel sheet with low cost and little fluctuation in the groove width, and as a result, having a stable magnetic domain control effect, and a method for manufacturing the same.

Means for Solving the Problem

The gist of the present invention is to form an insulation coating containing pseudo-tetragonal aluminum borate and silica as an insulation coating for grain-oriented electrical steel sheets and use it as a resist coating during electrolytic etching.

The insulation coating has exceptional chemical resistance not only to acidity but also to alkalinity and peeling or the like hardly occurs during electrolytic etching. As a result, it is possible to form grooves with little fluctuation in the width and dot-row shaped recesses with little fluctuation in the hole diameter, and the magnetic domain refining effect, that is, low iron loss, can be realized. Here, since the grooves and dot-row shaped recesses do not disappear even after subsequent stress release annealing or the like, the magnetic domain refining effect likewise does not disappear.

In addition, since a coating containing pseudo-tetragonal aluminum borate and silica can be used not only as a resist film but also as an insulation coating as it is, the process is simplified, the operation efficiency is improved, and the cost is also reduced. In addition, the coating can impart high coating tension to the electrical steel sheet, and thereby the low iron loss can be further promoted.

According to the present invention, the following aspects are provided as means for solving the problem.

(1) A grain-oriented electrical steel sheet having a final annealing film mainly composed of forsterite and an insulation coating containing pseudo-tetragonal aluminum borate and silica on its surface, in which one surface or both surfaces of the steel sheet have linear grooves or dot-row shaped recesses with a depth of 5 to 40 μm.

(2) A method for manufacturing a grain-oriented electrical steel sheet, including forming an insulation coating obtained by applying a coating solution composed of hydrous silicate particles containing aluminum and boric acid to a grain-oriented electrical steel sheet after final annealing and firing it, then removing part of the insulation coating on one surface or both surfaces in linear shape or dot-row shape to expose base steel, and then forming linear grooves or dot-row shaped recesses with a depth of 5 to 40 μm by electrolytic etching.

Effects of the Invention

A coating containing pseudo-tetragonal aluminum borate and silica provided on the grain-oriented electrical steel sheet according to one embodiment of the present invention is used as a resist coating and has exceptional chemical resistance not only to acidity but also to alkalinity. Therefore, the coating is less likely to peel off during electrolytic etching, etching can be stably performed, and the yield of the product can increase.

In addition, according to such stable etching, precise groove processing can be performed on the electrical steel sheet, and the magnetic domain refining effect, that is, low iron loss, can be realized. Here, since the grooves do not disappear even after subsequent stress release annealing or the like, the magnetic domain refining effect likewise does not disappear.

In addition, since the coating can be used not only as a resist film but also as an insulation coating without change, the manufacturing process is simplified, and thereby the operation efficiency is improved, and cost reduction is also realized.

In addition, the coating as an insulation coating can impart high coating tension to an electrical steel sheet, and thereby low iron loss can be further promoted.

Therefore, according to the present invention, it is possible to provide a grain-oriented electrical steel sheet with low cost and little fluctuation in the groove width, and as a result, having a stable magnetic domain control effect, and a method for manufacturing the same.

EMBODIMENT(S) FOR IMPLEMENTING THE INVENTION

Figure 1:
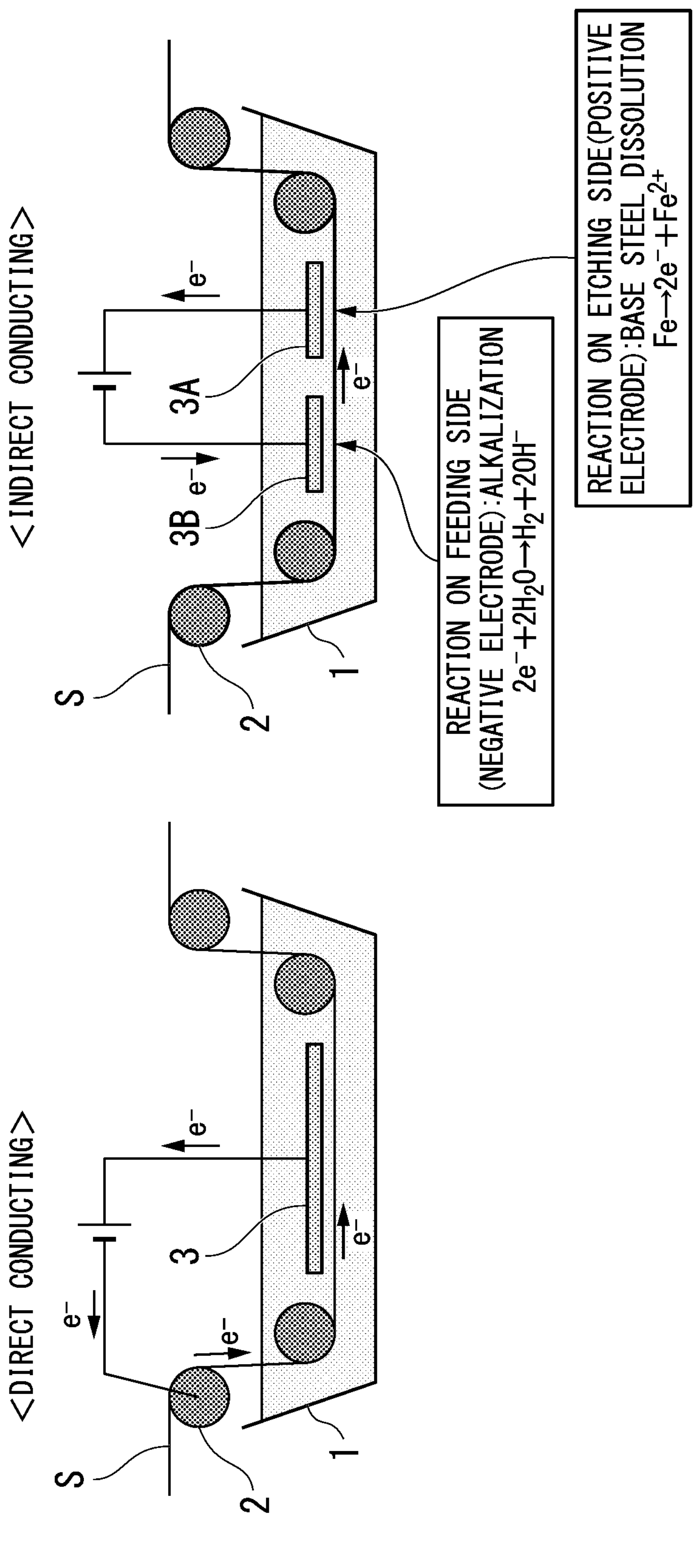
FIG. 1 is a schematic view illustrating direct conducting and indirect conducting in electrolytic etching.

A typical process of manufacturing a grain-oriented electrical steel sheet is as follows, and for the grain-oriented electrical steel sheet according to the present embodiment, unless there is a particular contradiction, a manufacturing process by a general method can be applied. First, a slab containing 2 to 4 mass % of Si is hot-rolled and the hot-rolled sheet is annealed. Next, the sheet is subjected to cold rolling once or twice or more times with intermediate annealing therebetween to have a final sheet thickness, and decarburization annealing is performed. Then, an annealing separator mainly composed of MgO is applied and final annealing is performed. Thereby, the crystal structure with the (110) [001] orientation as a main orientation develops and a final annealing film mainly composed of forsterite ($Mg_2SiO_4$) is formed on the surface of the steel sheet. Next, a coating solution for forming an insulation coating (in this specification, may be referred to as a coating solution or coating liquid for forming an insulation coating) is applied and fired, and an insulation coating is formed on the surface of the final annealing coating. Then, the grain-oriented electrical steel sheet on which the insulation coating is formed is shipped.

A grain-oriented electrical steel sheet according to one embodiment of the present invention has a final annealing film mainly composed of forsterite and an insulation coating containing pseudo-tetragonal aluminum borate and silica on its surface, and one surface or both surfaces of the steel sheet have linear grooves with a depth of 5 to 40 μm and little fluctuation in the groove width or dot-row shaped recesses with little diameter fluctuation.

A final annealing film mainly composed of forsterite is obtained by applying an annealing separator containing MgO to the surface of a steel sheet (decarburized annealing sheet) and performing final annealing. MgO in the annealing separator reacts with an $SiO_2$ internal oxidation layer to form a final annealing film mainly composed of forsterite ($Mg_2SiO_4$) on the surface of the steel sheet. The $SiO_2$ internal oxidation layer is formed on the surface layer of the steel sheet by oxidation of Si in the steel sheet during decarburization annealing. Here, if the MgO amount in the annealing separator is insufficient, since forsterite ($Mg_2SiO_4$) may not be sufficiently formed, the MgO content of the annealing separator may be 50 mass % or more.

The insulation coating containing pseudo-tetragonal aluminum borate and silica is obtained by applying a coating solution containing aluminum-containing hydrous silicate particles and boric acid to the steel sheet having the above final annealing coating and firing the coating solution. Therefore, the insulation coating may contain a pseudo-tetragonal aluminum borate $xAl_20_3.yB_2O_3$ produced by the reaction of an Al component in hydrous silicate particles with boric acid and an amorphous component such as silica derived from residual components other than Al in hydrous silicate particles. The insulation coating containing pseudo-tetragonal aluminum borate and silica has exceptional coating tension and exceptional corrosion resistance. It is thought that this is because pseudo-tetragonal aluminum borate crystals cause exceptional coating tension, and exceptional corrosion resistance is generated by using a structure in which an amorphous layer such as silica surrounds a crystal phase.

Here, exceptional coating tension and corrosion resistance may be equal to or better than those of a conventional insulation coating, particularly, an insulation coating when a coating solution containing a chromium compound, which has been widely used in the related art, is used. As a reference, in the insulation coating when a coating solution containing a chromium compound is used, the coating tension is approximately 8 MPa, and the corrosion resistance is 0%. In the insulation coating according to the present embodiment, in consideration of acceptable likelihood, the coating tension may be 5 MPa or more, preferably 8 MPa or more, and more preferably 10 MPa or more. In addition, the corrosion resistance may be 10% or less, preferably 5% or less, more preferably 1% or less, or 0%. Here, a corrosion resistance evaluation method will be described below.

Here, detailed conditions for obtaining an insulation coating such as the composition of the coating solution and the firing temperature will be described below.

In addition, the insulation coating according to the present embodiment has exceptional resist resistance in electrolytic etching, and therefore can be used as a resist coating. Specifically, the insulation coating has exceptional chemical resistance not only to acidity but also to the alkalinity and is less likely to be dissolved and peel off during electrolytic etching. As a result, fluctuation in the groove width and fluctuation in the diameter of recesses after etching are reduced.

Here, the reason why chemical resistance to not only acidity but also alkalinity is required in electrolytic etching will be described with reference to FIG. 1. In the electrolytic etching, an object to be etched (steel sheet) is immersed in an electrolytic solution, a current is applied to the object to be etched (steel sheet), and the object to be etched (steel sheet) is electrically dissolved. Generally, in the actual manufacturing scale, steel sheets are continuously treated in consideration of productivity. During the continuous treatment, if an insulation coating is not applied to the steel sheet, as shown in the left in FIG. 1, direct conducting in which one electrode is brought into contact with a steel sheet S outside an electrolytic solution bath 1 via a conductor roller 2, and the other electrode 3 is placed in the electrolytic solution bath 1 is possible. However, in the steel sheet on which an insulation coating is applied, since direct conducting with a conductor roller is not possible, as shown in the right in FIG. 1, indirect conducting is used. In the indirect conducting, both electrodes 3A and 3B are placed in the electrolytic solution bath 1, and the surrounding liquid properties change according to the electrodes 3A and 3B. Specifically, the side of the positive electrode 3A becomes acidic and the side of the negative electrode 3B becomes alkaline. Therefore, the object to be etched (steel sheet), particularly, a resist material thereof, is required to have chemical resistance to both acids and alkalis.

As seen in the related art, for example, Patent Documents 2 and 3, the insulation coating (resist coating) mainly composed of colloidal silica and phosphate does not have sufficient resistance to alkalinity and is often dissolved and peels off during electrolytic etching. If the resist coating easily peels off, since peeling off of the resist coating occur significantly near the grooves, fluctuation in the groove width and fluctuation in the recess diameter become significant. As a result, it is difficult to achieve a desired magnetic domain refining effect, that is, low iron loss, and the yield of the product also decreases.

On the other hand, the insulation coating according to the present embodiment has exceptional chemical resistance not only to acidity but also to alkalinity and peeling or the like hardly occurs during electrolytic etching. Therefore, electrolytic etching can be performed stably, and the yield of the product can increase. In addition, according to such stable electrolytic etching, the electrical steel sheet can be subjected to precise groove processing or dot-row shaped recess processing, and the magnetic domain refining effect, that is, low iron loss, can be realized. Here, since the grooves and dot-row shaped recesses do not disappear even after subsequent stress release annealing or the like, the magnetic domain refining effect likewise does not disappear.

In order to quantitatively evaluate the chemical resistance of the insulation coating as a resist coating to acidity and alkalinity, the following method may be used. That is, there is a method in which a resist coating part with a certain area, which is a part in which the base steel is not exposed, is immersed in an electrolytic solution, and the change in current over time when an electrolytic treatment is performed thereon at a constant voltage is observed. As an example, the electrical steel sheet on which an insulation coating (resist coating) is formed is cut into 55 mm×150 mm and covered with a vinyl adhesive tape so that the resist coating part 20 mm×20 mm is exposed, the exposed part where the resist coating part is exposed is made to face the counter electrode of the platinum-plated Ti sheet in a 10% NaCl solution, the distance between the exposed part and the electrode is set to 40 mm, electrolysis is performed by applying a voltage of 10 V between the exposed part and the electrode, and the change in density of the current that flows between the exposed part and the electrode over time is measured. Even if electrolysis is initiated by applying a voltage, if it is more difficult for the current to flow, peeling off is less likely to occur, that is, chemical resistance is higher. When the amount of the insulation coating formed after firing is about 4.5 g/m$^2$, if the current density 20 seconds after the voltage is applied is 0.5 A/cm$^2$ or less, the resist coating part can be evaluated as a stable area without peeling off of the insulation coating. When the current density is lower, the chemical resistance is higher, and thus the current density may be preferably 0.2 A/cm$^2$ or less, and more preferably 0.1 A/cm$^2$ or less.

On one surface or both surfaces of the grain-oriented electrical steel sheet according to the present embodiment, there are linear grooves or dot-row shaped recesses with a depth of 5 to 40 μm.

Due to the presence of these linear grooves or recesses, the magnetic domain of the electrical steel sheet is refined, and low iron loss is realized. These linear grooves or recesses can be obtained by the following procedure. That is, the insulation coating fired on one surface or both surfaces of the steel sheet is partially removed in a continuous line shape or in a discontinuous dot-row shape. As a method of partially removing an insulation coating, for example, laser irradiation described in Patent Documents 1 to 3 can be used, and other methods through which the same results are obtained may be used. In the subsequent electrolytic etching process, grooves or recesses are processed according to the shape of the removed insulation coating. This shape has a great effect on magnetic characteristics. The depth of the grooves or recesses that are parts where the insulation coating is removed is 5 to 40 μm. If the depth of the grooves or recesses is less than 5 μm, the magnetic domain refining effect is not sufficient, and if the depth is larger than 40 μm, the magnetic flux density decreases significantly. In addition, unless otherwise specified here, the starting point of the depth is the base metal surface of the steel sheet, and the distance from the starting point to the steel sheet in the inner direction (a sheet thickness direction) is referred to as the depth. For example, the depth of 5 μm refers to a distance of 5 μm from the base metal surface of the steel sheet to the steel sheet in the inner direction (a sheet thickness direction). The depth of the grooves or recesses may be 22 mm or more or 22 mm or less.

In addition, the shape of the grooves or recesses and the like can be appropriately adjusted according to the desired magnetic domain refining effect and the like. In one embodiment, the width of the groove may be 50 μm or more or 150 μm or more. In addition, the width of the groove may be 400 μm or less or 150 μm or less. In addition, the interval between grooves may be, for example, 2 mm or more or 3 mm or more. In addition, the interval between grooves may be, for example, 8 mm or less or 3 mm or less.

In addition, in the case of a dot-row shape, the diameter of the dot may be, for example, 50 μm or more or 150 μm or more. In addition, the diameter of the dot may be, for example, 400 μm or less or 150 μm or less. The center-to-center distance between adjacent points may be, for example, 50 μm or more or 300 μm or more. In addition, the center-to-center distance between adjacent points is 1,000 μm or less or 300 μm or less. The row interval is, for example, 2 mm or more or 3 mm or more. In addition, the row interval is, for example, 8 mm or less or 3 mm or less. In addition, the direction of the line or dot row may be a direction of 45° to 90° From the rolling direction.

Fluctuations s in the groove width and recess diameter are important, and in order to obtain an effective magnetic control effect, it is desirable that the standard deviation of groove widths and recess diameters be within ±20% or less in either case of grooves and dot-row recesses. The standard deviation of groove widths and recess diameters is more preferably within ±10%.

The depth of the grooves or recesses can be controlled using the current density and the time during electrolytic etching. In addition, the etching rate can be controlled by changing the current density. Therefore, even if the line speed changes depending on conditions of the facility, it can be easily dealt with.

If the current density is too high, damage to the insulation coating becomes large, and the facility becomes large, and thus the current density per unit area may be 0.6 A/cm$^2$ (60 A/dm$^2$) or less of the steel sheet. In addition, if the current density is too low, the current efficiency will drop, but as described above, the current density is not particularly limited in order to respond to conditions of the facility. Neutral salt solutions such as NaCl, $NaNO_3$, and $Na_2SO_4$ may be used as an electrolytic solution for electrolytic etching because they are easy to treat. As described above, since an insulation coating (resist coating) is applied to the steel sheet, the conducting method is performed according to an indirect conducting method.

On the surface of the steel sheet obtained after electrolytic etching, since the base steel is exposed in the form of grooves or recesses, as necessary, again, an insulation coating or an anti-corrosion coating may be applied to the entire surface of the steel sheet. In this case, if $SiO_2$ is precipitated in the forsterite-lacking part of the grooves or recesses, it easily forms a coating, and therefore the steel sheet may be electrolytically treated in an aqueous silicate solution.

Manufacturing conditions for the insulation coating (resist coating) according to one embodiment and the like will be described in detail. The insulation coating is obtained by applying a coating solution for forming an insulation coating to a grain-oriented electrical steel sheet having a final annealing film after final annealing and then performing a firing treatment.

Coating Solution for Forming Insulation Coating for Grain-Oriented Electrical Steel Sheet A coating solution (coating liquid) for forming an insulation coating for grain-oriented electrical steel sheets according to the present embodiment contains hydrous silicate particles containing aluminum and boric acid. That is, the insulation coating disclosed in Patent Document 4 is used.

Hereinafter, respective materials constituting a coating solution according to the present embodiment will be described.

Hydrous Silicate Particles

The coating solution for forming an insulation coating contains hydrous silicate particles. One type or two or more types of hydrous silicate particles may be used.

Hydrous silicates are also called clay minerals and have a layered structure in many cases. The layered structure is a structure in which a 1:1 silicate layer represented by Composition Formula $X_{2\text{-}3}Si_2O_5(OH)_4$ and a 2:1 silicate layer represented by Composition Formula $X_{2\text{-}3}(Si, Al)_4O_{10}(OH)_2$ (X is Al, Mg, Fe, etc.) are laminated alone or in combination. At least one of water molecules and ions may be contained between the layers of the layered structure.

Typical examples of hydrous silicates include kaoline (or kaolinite) ($Al_2Si_2O_5(OH)_4$), talc ($Mg_3Si_4O_{10}(OH)_2$), and pyrophyllite ($Al_2Si_4O_{10}(OH)_2$). Most of the hydrous silicate particles are obtained by purifying and pulverizing naturally occurring hydrous silicates. For the hydrous silicate particles, in consideration of ease of industrial availability, it is preferable to use at least one selected from the group consisting of kaoline, talc, and pyrophyllite particles. In addition, in order to obtain exceptional coating tension, exceptional corrosion resistance, and exceptional chemical resistance (as a resist coating, chemical resistance not only to acidity but also to alkalinity), aluminum-containing hydrous silicate particles are used. Aluminum-containing hydrous silicate particles have exceptional reactivity with boric acid to form pseudo-tetragonal aluminum borate and silica, and exceptional coating tension, exceptional corrosion resistance, and exceptional chemical resistance are obtained. In this regard, for the hydrous silicate particles, it is preferable to use at least one of kaoline and pyrophyllite particles, and it is more preferable to use kaoline. A combination of hydrous silicate particles may be used.

If the specific surface area of the hydrous silicate particles is larger, the reaction between hydrous silicate particles and boric acid is easily promoted. Therefore, the specific surface area of the hydrous silicate particles is preferably 20 $m^2/g$ or more, more preferably 40 $m^2/g$ or more, and still more preferably 50 $m^2/g$ or more. On the other hand, the upper limit value of the specific surface area is not particularly limited, for example, the specific surface area may be 200 $m^2/g$ or less, 180 $m^2/g$ or less, or 150 $m^2/g$ or less. If the upper limit value of the specific surface area is equal to or less than the above value, it becomes easier to maintain the dispersion stability (viscosity stability) of the coating solution for forming an insulation coating. The specific surface area of the hydrous silicate particles is a specific surface area based on the BET method and measured by the method according to JIS Z 8830:2013.

Manufacturing of Hydrous Silicate Particles with Specific Surface Area of 20 $m^2/g$ or More Among hydrous silicate particles commercially available for industrial applications, it is difficult to obtain particles with a specific surface area of 20 $m^2/g$ or more. Therefore, for example, when a pulverization treatment is performed on a commercial product, it is possible to obtain hydrous silicate particles with a specific surface area of 20 $m^2/g$ or more.

Ball mills, vibration mills, beads mills, jet mills and the like are effective pulverization devices for hydrous silicate particles. These pulverization treatments may be dry pulverization in which hydrous silicate particles are pulverized in the form of a powder or wet pulverization in which hydrous silicate particles are pulverized in a slurry state in which hydrous silicate particles are dispersed in a dispersion medium such as water or an alcohol. For the pulverization treatment, both the dry pulverization and wet pulverization are effective. The specific surface area of hydrous silicate particles increases with the pulverization time by any of various pulverization devices. Therefore, when the pulverization time is managed, it is possible to obtain hydrous silicate particles having a required specific surface area and a dispersion thereof.

The shape of hydrous silicate particles is not particularly limited, and sheet-like particles may be used. This is because, in many cases, the hydrous silicate particles have a layered structure, that is, a structure in which a plurality of layers are laminated. The pulverization treatment causes separation between layers of hydrous silicate particles. That is, according to the pulverization treatment, the thickness of the sheet-like hydrous silicate particles becomes thin. If the thickness is thinner, the reaction with boric acid is easily promoted. Therefore, the thickness of hydrous silicate particles (sheet-like particles) is preferably 0.1 μm or less, more preferably 0.05 μm or less, and still more preferably 0.02 μm or less.

On the other hand, the lower limit of the thickness of hydrous silicate particles (sheet-like particles) is not particularly limited, and if the thickness is too small, when suspended in water, the surface of the particles is activated, and the viscosity of the suspension increases. Therefore, the thickness of hydrous silicate particles may be 0.001 μm or more, preferably 0.002 μm or more, and more preferably 0.005 μm or more. The thickness of hydrous silicate particles (sheet-like particles) is determined by analyzing an image of the shape of hydrous silicate particles obtained by a scanning electron microscope or a transmission electron microscope.

In the case of a wet pulverization treatment, the viscosity of the dispersion increases as the specific surface area of hydrous silicate particles increases. Therefore, if the specific surface area increases to exceed 200 $m^2/g$ according to pulverization, the viscosity of the dispersion increases and gelation may occur and interfere with the pulverization treatment. Therefore, as necessary, a dispersant may be added to the dispersion.

An increase in viscosity during the pulverization treatment can be reduced by adding a dispersant. However, among dispersants, if an organic dispersant is added, it may decompose and carburize when the insulation coating is fired and may carburize in the grain-oriented electrical steel sheet, and thus, if a dispersant is used, an inorganic dispersant is preferable. Examples of inorganic dispersants include polyphosphate and water glass and the like. Specific examples of the former dispersant include sodium diphosphate and sodium hexametaphosphate and the like. Specific examples of the latter dispersant include sodium silicate and potassium silicate and the like.

The amount of these dispersants added is preferably reduced to 20 mass % or less with respect to the total mass of the hydrous silicate particles. If the amount of the inorganic dispersant added is 20 mass % or less, the change in composition of the insulation coating after firing is reduced, and higher coating tension, higher corrosion resistance and higher chemical resistance can be easily obtained. Since the dispersant is an optional additional component, the lower limit value of the dispersant is not particularly limited and may be 0%. That is, the coating solution may not contain a dispersant such as polyphosphate or water glass. In the case of a dry pulverization treatment, it is not necessary to add a dispersant during pulverization.

Boric Acid

For boric acid, one obtained by a known manufacturing method can be used, and either orthoboric acid or metaboric acid may be used. For boric acid, it is preferable to use orthoboric acid. Boric acid may be particle-like boric acid or boric acid dissolved or dispersed in water.

Content Ratio Between Hydrous Silicate Particles and Boric Acid

The content ratio between hydrous silicate particles and boric acid contained in the coating solution for forming an insulation coating is the molar ratio of B (boron)/Al (aluminum) and is not particularly limited. Here, boric acid and borate have relatively low solubility in water. Therefore, if the molar ratio of B/Al is too large, it is not necessary to reduce the concentration of the coating solution, and it is difficult to obtain a desired amount of the insulation coating. Therefore, the molar ratio of B/Al is 1.5 or less, preferably 1.3 or less, and more preferably 1.0 or less. The lower limit of the molar ratio of B/Al is not particularly limited, and the molar ratio of B/Al may be 0.05 or more or 0.1 or more. The molar ratio of B/Al is preferably 0.2 or more in order to obtain exceptional coating tension, exceptional corrosion resistance, and exceptional chemical resistance. Therefore, the content ratio between hydrous silicate particles and boric acid is preferably 0.2 to 1.5 as a molar ratio of B (boron)/Al (aluminum).

Dispersion Medium (or Solvent)

In addition to water, for example, alcohols such as ethyl alcohol, methyl alcohol, and propyl alcohol can be used, as the dispersion medium or solvent used for the coating solution for forming an insulation coating. It is preferable to use water as the dispersion medium or solvent because it has no flammability.

The concentration of the solid content of the coating solution for forming an insulation coating is not particularly limited as long as it is within a range in which it can be applied to the grain-oriented electrical steel sheet. The concentration of the solid content of the coating solution for forming an insulation coating may be, for example, 5 mass % or more, and preferably 10 mass % or more. In addition, the concentration of the solid content of the coating solution for forming an insulation coating may be, for example, 50 mass % or less and preferably 30 mass % or less.

In addition, as necessary, the coating solution for forming an insulation coating may or may not contain a small amount of other additives as long as properties of coating tension, corrosion resistance, and chemical resistance are not impaired. In other words, the content of other additives may be 0 mass %. If the coating solution contains a small amount of other additives, for example, the amount may be 3 mass % or less or 1 mass % or less with respect to the total solid content of the coating solution for forming an insulation coating. Here, examples of other additives include a surfactant that prevents repelling of the coating solution on the steel sheet.

The viscosity of the coating solution for forming an insulation coating is preferably 1 mPa·s to 100 mPa·s in consideration of coating workability and the like. If the viscosity is too high, it is difficult to apply the coating solution, and if the viscosity is too low, the coating solution flows and it is difficult to obtain a desired amount of the insulation coating. Measurement is performed with a B-type viscometer (Brookfield viscometer). In addition, the measurement temperature is 25° C.

Here, in consideration of the operation environment, the coating solution for forming an insulation coating preferably does not contain hexavalent chromium.

In addition, in order to obtain an insulation coating having high tension, high corrosion resistance and exceptional chemical resistance not only to acidity but also to alkalinity in etching, the coating solution for forming an insulation coating according to the present embodiment is preferably fired at a high temperature, for example, 600° C. or higher. When the coating solution for forming an insulation coating contains a resin, the resin is decomposed by firing and carburized in the steel sheet. As a result, magnetic characteristics of the grain-oriented electrical steel sheet deteriorate. In this regard, the coating solution for forming an insulation coating preferably does not contain an organic component such as a resin.

Here, the above coating solution for forming an insulation coating can impart tension to the steel sheet by forming a coating by firing. Therefore, the above coating solution for an insulation coating is suitable as a coating solution for forming an insulation coating for the grain-oriented electrical steel sheet. Here, the above coating solution for forming an insulation coating can be applied to the non-grain-oriented electrical steel sheet. However, even if the above coating solution for forming an insulation coating is applied to the non-grain-oriented electrical steel sheet, the insulation coating essentially does not contain an organic component, and a punchability improving effect of the steel sheet is not provided. Therefore, the benefits of application to the non-grain-oriented electrical steel sheet are few.

Method of Preparing Coating Solution

A coating solution for forming an insulation coating may be prepared by mixing and stirring hydrous silicate particles and boric acid together with a dispersion medium (solvent). The order in which hydrous silicate particles and boric acid are added is not particularly limited. For example, a dispersion in which a predetermined amount of hydrous silicate particles is dispersed in water as a dispersion medium may be prepared and a predetermined amount of boric acid may then be added and mixed and stirred. In addition, a boric acid aqueous solution in which a predetermined amount of boric acid is dissolved in water as a solvent may be prepared, and a predetermined amount of hydrous silicate particles may be then added to the boric acid aqueous solution and mixed and stirred.

In addition, as necessary, other additives may be added, mixed and stirred. In addition, the coating solution for forming an insulation coating may be adjusted to have a desired solid content concentration. The liquid temperature of the coating solution may be high (for example, 50° C.) or room temperature (for example, 25° C.).

Analysis of Components of Coating Solution

In the coating solution for forming an insulation coating, the molar ratio of B/Al can be measured as follows.

In a coating solution in which hydrous silicate particles and boric acid are mixed, the two components hardly react with each other at 100° C. or lower. Therefore, a coating solution at 100° C. or lower is, for example, in a slurry state in which hydrous silicate particles are dispersed in a boric acid aqueous solution.

Specifically, first, the coating solution for forming an insulation coating is filtered. According to filtering, the coating solution is separated into a filtrate containing a boric acid aqueous solution derived from boric acid before mixing and the residue containing hydrous silicate derived from hydrous silicate particles. Then, the filtrate is subjected to ICP-AES analysis (inductively coupled plasma-atomic emission spectroscopy) and the amount of boric acid is clarified. In addition, the amount of hydrous silicate is clarified from the weight of the residue, the residue is additionally subjected to fluorescent X-ray analysis, and thus the concentration of aluminum contained in hydrous silicate is clarified. By adjusting the above results, the molar ratio (B/Al) of boron to aluminum in the coating solution is clarified.

In addition, for the specific surface area of hydrous silicate particles, the hydrous silicate particles separated above are dispersed in a solvent in which hydrous silicate particles are not dissolved. Then, the specific surface area is determined by the above BET method. In addition, the thickness of hydrous silicate particles (sheet-like particles) is determined by performing observation under an electron microscope as described above.

Application of Coating Solution for Forming an Insulation Coating and Firing Treatment A coating solution for forming an insulation coating is applied to the grain-oriented electrical steel sheet after last final annealing and a firing treatment is then performed. The coating amount is not particularly limited. In order to obtain exceptional coating tension, exceptional corrosion resistance, and exceptional chemical resistance, the coating solution is preferably applied so that the amount of the insulation coating after the insulation coating is formed is in a range of 1 $g/m^2$ to 10 $g/m^2$. More preferably, the coating solution is applied so that the amount of the insulation coating after the insulation coating is formed is in a range of 2 $g/m^2$ to 8 $g/m^2$. Here, the coating amount (amount of the insulation coating) after the firing treatment can be determined from the weight difference before and after the insulation coating peels off.

Here, in the insulation coating according to the present embodiment, in consideration of acceptable likelihood, the coating tension may be 5 MPa or more, preferably 8 MPa or more, and more preferably 10 MPa or more. In addition, the corrosion resistance may be 10% or less, preferably 5% or less, more preferably 1% or less, and most preferably 0%. In addition, a as an index of exceptional chemical resistance, a current density of 0.5 $A/cm^2$ or less, preferably 0.2 $A/cm^2$ or less, and even more preferably 0.1 $A/cm^2$ or less, at 20 seconds after the application of voltage under the specified conditions may be used.

A method of applying the coating solution for forming an insulation coating to the grain-oriented electrical steel sheet after final annealing is not particularly limited. Examples thereof include coating methods using application methods such as a roll method, a spray method, and a dip method.

The coating solution for forming an insulation coating is applied to the surface of the steel sheet after final annealing and then fired. In order to form dense insulation coating and obtain exceptional coating tension, exceptional corrosion resistance, and exceptional chemical resistance, the reaction between hydrous silicate particles and boric acid is promoted. Many hydrous silicates release structure water at a heating temperature of about 550° C. and react with boric acid in this process. If the firing temperature is lower than 600° C., the reaction between hydrous silicate particles and boric acid is not sufficient. Therefore, an insulation coating in which hydrous silicate particles and boric acid are mixed is formed. Therefore, the firing temperature may be 600° C. or higher. The firing temperature is preferably 700° C. or higher and may be 800° C. or higher. On the other hand, if a firing temperature of higher than 1,000° C. is used, since the grain-oriented electrical steel sheet softens and is easily strained, the firing temperature may be 1,000° C. or lower. The firing temperature is preferably 950° C. or lower and more preferably 900° C. or lower, and the firing temperature may be 850° C. or lower or 800° C. or lower. The firing time may be, for example, 5 seconds or longer and preferably 10 seconds or longer. In addition, the firing time may be 300 seconds or shorter and preferably 120 seconds or shorter.

Here, a heating method for performing a firing treatment is not particularly limited, and examples thereof include methods using a radiation furnace, a hot air furnace, an induction heating and the like.

In order to obtain exceptional coating tension, exceptional corrosion resistance, and exceptional chemical resistance, the insulation coating formed on the surface of the steel sheet after the firing treatment is preferably a dense insulation coating. In this regard, the thickness of the insulation coating is preferably 0.5 μm or more, and more preferably 1 μm or more. In addition, the thickness of the insulation coating is preferably 5 μm or less, and more preferably 4 μm or less.

Here, the thickness of the insulation coating after the firing treatment can be determined by observing the cross section under an SEM.

The density can be evaluated according to the porosity in the insulation coating. It is thought that, if the insulation coating contains a large number of voids, the insulation coating has low coating tension and also poor corrosion resistance, and low chemical resistance. In the insulation coating for the grain-oriented electrical steel sheet according to the present embodiment, the porosity is 10% or less, preferably 5% or less, more preferably 3% or less, still more preferably 2% or less, and particularly preferably 1% or less.

Through the above processes, a grain-oriented electrical steel sheet having exceptional properties of coating tension, corrosion resistance and chemical resistance is obtained using the above coating solution for forming an insulation coating. In addition, a grain-oriented electrical steel sheet on which an insulation coating is provided using the above coating solution for forming an insulation coating has exceptional magnetic characteristics and additionally has an exceptional space factor.

When coating properties, corrosion resistance, magnetic characteristics, and the porosity of the insulation coating of the grain-oriented electrical steel sheet are evaluated, evaluation methods for each evaluation are as follows.

Corrosion Resistance

A 5 mass % NaCl aqueous solution is continuously sprayed on a grain-oriented electrical steel sheet formed into a test piece of 60 mm×100 mm while the temperature is maintained at 35° C., and after 48 hours, the state of rust occurrence is observed, and the area ratio is calculated.

Coating Tension

The coating tension is calculated from warpage of the steel sheet, which occurs when the insulation coating is formed only on one surface.

The coating tension is determined from warpage of the grain-oriented electrical steel sheet by the following formula.

$$\text{Formula: coating tension}=190\times\text{sheet thickness (mm)}\times\text{sheet warpage (mm)}/\{\text{sheet length (mm)}\}^2\text{[MPa]}$$

(Chemical Resistance)

In order to quantitatively evaluate the chemical resistance of the insulation coating as a resist coating to acidity and alkalinity, the current density may be measured by the following method. That is, there is a method in which a resist coating part with a certain area, which is a part in which the base steel is not exposed, is immersed in an electrolytic solution, and the change in current over time when an electrolytic treatment is performed thereon at a constant voltage is observed. For example, a grain-oriented electrical steel sheet obtained by firing the coating solution so that the insulation coating (resist coating) has a coating formation amount of about 4.5 g/m$^2$ is cut into 55 mm×150 mm and covered with a vinyl adhesive tape so that the resist coating part 20 mm×20 mm is exposed, the coating exposed part is made to face the counter electrode of the platinum-plated Ti sheet in a 10% NaCl solution, the distance between the electrodes is set to 40 mm, electrolysis is performed by applying a voltage of 10 V between the electrodes, and the change in density of the current that flows between the electrodes over time is measured. It can be considered that, even if electrolysis is initiated by applying a voltage, if it is more difficult for the current to flow, peeling off is less likely to occur, that is, chemical resistance, higher. The current density 20 seconds after the voltage is applied to each sample may be compared.

Space Factor

The space factor is measured according to the method described in JIS C 2550-5:2011.

Porosity of Insulation Coating

A cross-sectional image of the insulation coating is obtained with backscattered electrons. Binarization processing is performed on the image to obtain a binary image. An area $A_C$ of the cross section is obtained by removing the area of voids (pores) from the binary image.

An area A of the cross section including the area of voids (pores) is obtained from the void-filled binary image. Then, the porosity F is determined by the following Formula (F).

The insulation coating is observed at a magnification of 5,000 to obtain five images, and the average value is calculated from the obtained porosity and used as the porosity of the insulation coating.

$$\text{Formula } (F)\quad F=\{1-(A_C/A)\}\times 100$$

(Iron Loss and Magnetic Flux Density)

The iron loss and the magnetic flux density are measured according to the method described in JIS C 2550-1:2011. Specifically, under conditions of an amplitude of 1.7 T and a frequency of 50 Hz for the measurement magnetic flux density, the iron loss ($W_{17/50}$) per unit mass is measured. In addition, for the magnetic flux density ($B_8$), a value of the magnetic flux density at a magnetizing force of 800 A/m is measured.

Here, examples of preferable embodiments of the present invention have been described, but the present invention is not limited to the above examples. The above embodiments are only examples, and any embodiment that has substantially the same configuration as the technical idea described in the claims of the present invention and exhibits the same operations and effects is included in the technical scope of the present invention.

EXAMPLES

Hereinafter, the present invention will be described in detail with reference to examples, but the present invention is not limited thereto. It can be clearly understood that those skilled in the art can realize various modifications and alternations within the scope of ideas described in the scope of the claims, and these are naturally also included in the technical scope of the present invention.

Grain-Oriented Electrical Steel Sheet in the Related Art

Figure 2:
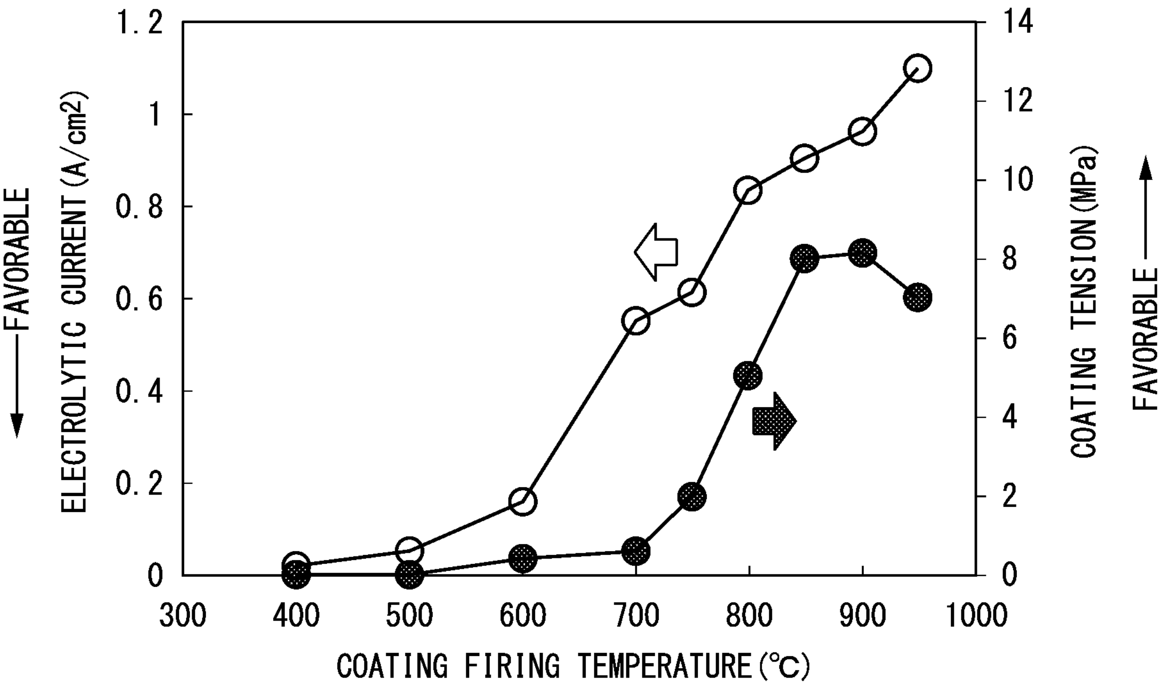
FIG. 2 is a graph showing the relationship between a firing temperature and properties (electrolytic current and coating tension) of an insulation coating of a grain-oriented electrical steel sheet having an insulation coating in the related art.

According to the disclosure of Patent Document 3, a grain-oriented electrical steel sheet with an insulation coating (resist coating) fired at different firing temperatures was prepared, and the coating tension and chemical resistance (the current density 20 seconds after electrolytic etching starts for a resist coating) were measured. Specifically, a coating liquid containing aluminum phosphate (50 mass % aqueous solution: 57 parts by mass), chromic anhydride (6 parts by mass), and colloidal silica (20 mass % aqueous dispersion: 100 parts by mass) was used. The mass ratio Ws of colloidal silica to aluminum phosphate in the coating liquid was 0.70. This coating solution was applied to the finally-annealed grain-oriented electrical steel sheet (a sheet thickness 0.23 mm, $B_8$=1.93 T), dried and fired at 400° C., 500° C., 600° C., 700° C., 750° C., 800° C., 850° C., 900° C., and 950° C. to form an insulation coating. The amount of the insulation coating formed was adjusted to about 4.5 g/m$^2$. The above "coating tension" and "chemical properties" were evaluated for each grain-oriented electrical steel sheet on which the insulation coating was formed. The results are shown in FIG. 2.

The coating tension was about 0 MPa at a firing temperature of 700° C. or lower, the coating tension increased when the firing temperature was higher than 700° C., and was about 8 MPa at 850° C. or 900° C., but decreased at 950° C.

On the other hand, regarding the chemical resistance (the current density 20 seconds after electrolytic etching started for a resist coating), as the firing temperature increased, the current density also increased, and about 0.6 A/cm$^2$ at 700° C. was a value out of the range of 0.5 A/cm$^2$ or less, which was regarded as a stable area where peeling off of the insulation coating did not occur. When the firing temperature was further increased, the current density also further increased, which suggested that the chemical resistance was not sufficient.

Grain-Oriented Electrical Steel Sheet According to the Present Invention

Figure 3:
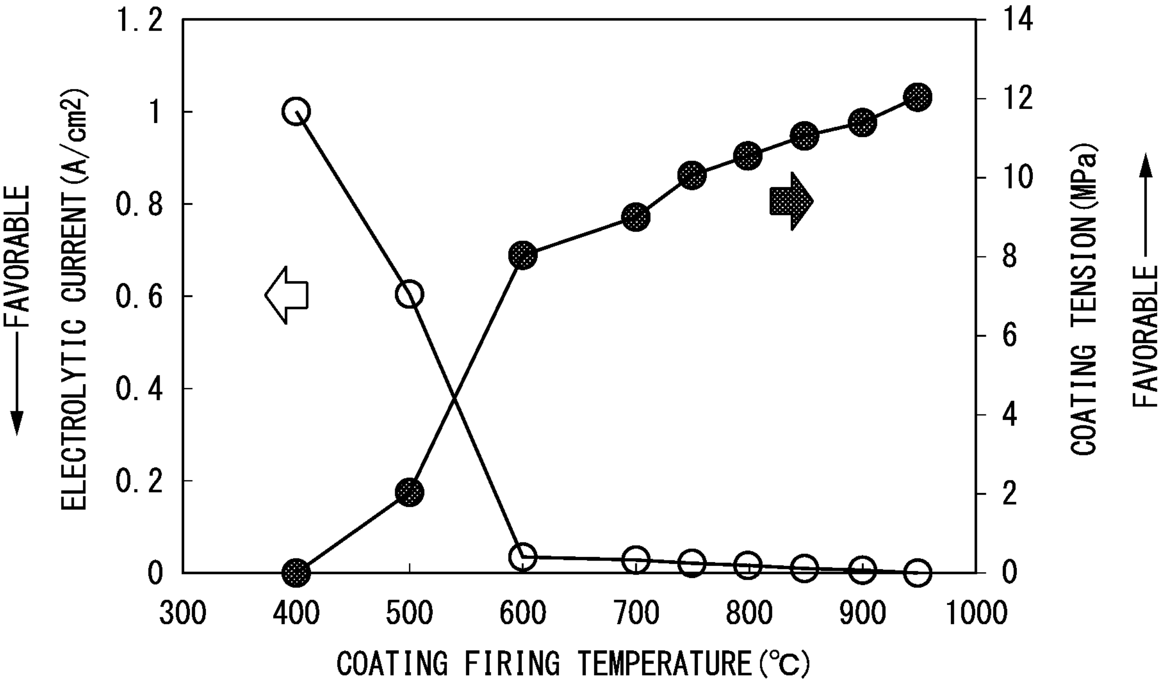
FIG. 3 is a graph showing the relationship between a firing temperature and coating properties (electrolytic current and coating tension) of a grain-oriented electrical steel sheet according to one embodiment of the present invention.

According to the present disclosure, a grain-oriented electrical steel sheet having an insulation coating fired at different firing temperatures was prepared, and the coating tension and chemical resistance (the current density 20 seconds after electrolytic etching started for a resist coating) were measured. Specifically, commercially available kaoline hydrous silicate particles were prepared, and pulverized with a ball mill so that the specific surface area was 50 m$^2$/g. A coating liquid was prepared by adding a boric acid aqueous solution so that the molar ratio of B/Al was 0.8 and the solid content concentration was 25%. This coating liquid was applied to the finally-annealed grain-oriented electrical steel sheet (a sheet thickness of 0.23 mm, $B_8$=1.93 T), dried and fired at 400° C., 500° C., 600° C., 700° C., 750° C., 800° C., 850° C., 900° C., and 950° C. to form an insulation coating. The amount of the insulation coating formed was adjusted to about 4.5 g/m$^2$. The above "coating tension" and "chemical properties" were evaluated for the grain-oriented electrical steel sheet on which the insulation coating was formed. The results are shown in FIG. 3.

The coating tension was 2 MPa or less at a firing temperature of 500° C. or lower, the coating tension increased when the firing temperature was higher than 500° C. and was higher than about 8 MPa at 600° C., and the coating tension was higher as the temperature was higher, and a high coating tension of 10 MPa or more was obtained at 750° C. or higher.

On the other hand, regarding the chemical resistance (the current density 20 seconds after electrolytic etching started for a resist coating), contrary to the example in the related art, the current density decreased as the firing temperature increased, and was much below about 0.1 A/cm$^2$ at 600° C. This sufficiently satisfied 0.5 A/cm$^2$ or less, which was regarded as a stable area where the insulation coating did not peel off. If the firing temperature was further increased, the current density further decreased, which confirmed that the chemical resistance was sufficient.

Improvement in Iron Loss Value According to Groove Processing or Dot-Row Shaped Recess Processing As shown in Table 1, iron loss values before and after groove processing was performed on the grain-oriented electrical steel sheet having an insulation coating (resist coating) in the related art and the grain-oriented electrical steel sheet having an insulation coating (resist coating) according to the present invention by electrolytic etching were measured.

In Table 1, No. 1 was an example of a grain-oriented electrical steel sheet having an insulation coating formed using a coating solution containing colloidal silica, phosphate, and chromic acid.

No. 2 was an example of a grain-oriented electrical steel sheet having an insulation coating having the same composition as that of No. 1 and manufactured at a firing temperature that was lower than that of the example of No. 1.

Nos. 3 and 4 were examples of a grain-oriented electrical steel sheet having an insulation coating formed using a coating solution containing alumina sol and boric acid.

Nos. 5 to 11 were examples of a grain-oriented electrical steel sheet having an insulation coating formed using a coating solution containing kaoline and boric acid.

No. 12 was an example of a grain-oriented electrical steel sheet having an insulation coating formed using a coating solution containing pyrophyllite and boric acid.

On the surfaces of the base steels of Nos. 1 to 12, a final annealing film mainly composed of forsterite was formed. In addition, the insulation coatings of Nos. 5 to 12 contained pseudo-tetragonal aluminum borate and silica.

The coating tension of each grain-oriented electrical steel sheet after the insulation coating was formed was measured. The coating tension shown in Table 1 was measured after firing and before YAG laser irradiation to be described below.

In this example, the insulation coating locally peeled off by YAG laser irradiation for groove processing or dot-row shaped recess processing by electrolytic etching.

In the case of Nos. 1 to 3, and 5 to 10, on the sheet surface of the grain-oriented electrical steel sheet, the insulation coating was removed in a line shape having a width of 0.15 mm at intervals of 3 mm perpendicular to the rolling direction.

In the case of No. 4, No. 11 and No. 12, on the sheet surface of the grain-oriented electrical steel sheet, the insulation coating was removed in a line of dots (interval between dots: 0.3 mm) having a diameter of 0.15 mm at intervals of 3 mm perpendicular to the rolling direction.

Then, each grain-oriented electrical steel sheet from which the insulation coating locally peeled off was electrolytically etched with a 10% NaCl solution to form linear grooves or dot-row shaped recesses. The depth of the grooves and recesses was adjusted by the current density and the electrolysis time during electrolytic etching.

According to observation of the surface after processing under a microscope, the groove width or recess diameter was measured at 100 locations for one condition, and the standard deviation thereof was determined.

Before and after groove processing, according to the method described in JIS C 2550-1:2011, under conditions of an amplitude of 1.7 T and a frequency of 50 Hz for the measurement magnetic flux density: the iron loss ($W_{17/50}$) per unit mass is measured. The results are shown in Table 1.

TABLE 1

| No. | Composition of coating solution | Firing temperature (° C.) | Coating tension (MPa) | Processing pattern | Depth of groove or recess (μm) | Standard deviation of groove width and recess diameter | Porosity (%) | Space factor (%) | Iron loss value (1.7 T, 50 Hz) (W/kg) Before groove or recess processing | Iron loss value (1.7 T, 50 Hz) (W/kg) After groove or recess processing |
|---|---|---|---|---|---|---|---|---|---|---|
| 1 | Colloidal silica, aluminum phosphate, chromic acid | 900 | 8 | line shape, line interval of 3 mm, groove width of 0.15 mm | 22 | 30% | 0 | 97.0 | 0.84 | 0.80 |
| 2 | Colloidal silica, aluminum phosphate, chromic acid | 600 | 2 | | 22 | 10% | 0 | 97.0 | 0.84 | 0.83 |
| 3 | alumina sol, boric | 900 | 14 | | 22 | 50% | 2 | 96.1 | 0.80 | 0.80 |
| 4 | acid | 900 | 14 | dot row shape, row interval of 3 mm, dot interval of 0.3 mm, dot diameter of 0.15 mm | 22 | 50% | 2 | 96.1 | 0.80 | 0.80 |

TABLE 1-continued

| No. | Composition of coating solution | Firing temperature (° C.) | Coating tension (MPa) | Processing pattern | Depth of groove or recess (μm) | Standard deviation of groove width and recess diameter | Porosity (%) | Space factor (%) | Iron loss value (1.7 T, 50 Hz) (W/kg) Before groove or recess processing | Iron loss value (1.7 T, 50 Hz) (W/kg) After groove or recess processing |
|---|---|---|---|---|---|---|---|---|---|---|
| 5 | kaoline, boric acid | 600 | 8 | line shape, line interval of 3 mm, groove width of 0.15 mm | 22 | 20% | 1 | 96.7 | 0.84 | 0.73 |
| 6 | | 900 | 11 | | 22 | 10% | 1 | 96.7 | 0.81 | 0.70 |
| 7 | | 900 | 11 | | 4 | 10% | 1 | 96.7 | 0.81 | 0.80 |
| 8 | | 900 | 11 | | 5 | 10% | 1 | 96.7 | 0.81 | 0.75 |
| 9 | | 900 | 11 | | 40 | 10% | 1 | 96.7 | 0.81 | 0.75 |
| 10 | | 900 | 11 | | 50 | 10% | 1 | 96.7 | 0.81 | 0.80 |
| 11 | | 900 | 11 | dot row shape, row interval of 3 mm, dot interval of 0.3 mm, dot diameter of 0.15 mm | 22 | 10% | 1 | 96.7 | 0.81 | 0.70 |
| 12 | pyrophyllite, boric acid | 800 | 11 | dot row shape, row interval of 3 mm, dot interval of 0.3 mm, dot diameter of 0.15 mm | 22 | 10% | 1 | 96.7 | 0.81 | 0.70 |

Based on Table 1, it was found that, in the examples of Nos. 1, 3, and 4, although the required coating tension was obtained, the groove width varied greatly due to the poor resist property, and it was difficult to reduce the iron loss.

It was found that, in the example of No. 2, although the resist property was favorable, the iron loss reduction effect was not obtained because the coating tension was small.

It was found that, in the example of No. 7, a sufficient iron loss reduction effect was not obtained because the groove depth was too small at 4 μm.

It was found that, in the example of No. 10, a sufficient iron loss reduction effect was not obtained because the groove depth was too large at 50 μm.

On the other hand, it was found that, in the examples of Nos. 5, 6, 8, 9, 11, and 12, due to the favorable resist property, the groove width fluctuation and the diameter fluctuation were small and the coating tension was large. Therefore, it was found that, if the groove depth was in a range of 5 to 40 μm, the magnetic domain refining effect was exhibited, and a grain-oriented electrical steel sheet with low iron loss was obtained.

The invention claimed is:

1. A grain-oriented electrical steel sheet having a final annealing film mainly composed of forsterite and an insulation coating containing pseudo-tetragonal aluminum borate and silica on its surface, wherein one surface or both surfaces of the steel sheet have linear grooves or dot-row shaped recesses with a depth of 5 to 40 μm.

2. A grain-oriented electrical steel sheet having a final annealing film comprising forsterite and an insulation coating containing pseudo-tetragonal aluminum borate and silica on its surface, wherein one surface or both surfaces of the steel sheet have linear grooves or dot-row shaped recesses with a depth of 5 to 40 μm.

* * * * *